United States Patent [19]
Wichers

[11] 3,944,344
[45] Mar. 16, 1976

[54] SPECTACLE STRUCTURE

[76] Inventor: Max F. Wichers, Main Mall White Lakes Center, 3630 Topeka Blvd., Topeka, Kans. 66611

[22] Filed: Jan. 17, 1975

[21] Appl. No.: 541,857

[52] U.S. Cl. ............... 351/41; 16/128 A; 351/110; 351/114; 351/123; 351/124; 351/153
[51] Int. Cl.² ... G02C 1/02; G02C 5/16; G02C 5/22
[58] Field of Search ........... 351/114, 123, 111, 153, 351/41, 110, 124; 16/128 A

[56] References Cited
UNITED STATES PATENTS

| | | | |
|---|---|---|---|
| 1,743,796 | 1/1930 | Nelson | 351/123 X |
| 2,671,379 | 3/1954 | Eloranta | 351/111 |
| 3,495,898 | 2/1970 | Del Vecchio | 351/41 |
| 3,744,887 | 7/1973 | Dunbar | 351/153 |

FOREIGN PATENTS OR APPLICATIONS

| | | | |
|---|---|---|---|
| 875,876 | 3/1953 | Germany | 351/111 |

Primary Examiner—Paul A. Sacher
Attorney, Agent, or Firm—Fishburn, Gold & Litman

[57] ABSTRACT

A spectacle structure having a plurality of flexible portions formed in head engaging components thereof is disclosed wherein the flexible portions permit unidirectional bending of the head engaging components of the spectacle structure to thereby conform to and exert inwardly directed pressures on the head of the person to support the spectacle structure thereon, said spectacle structure engaging the head portions for support with an absence of support by the nose or ears. The spectacle structure includes lens means depending from a front frame member and a pair of elongated temple members hingedly connected to respective opposite end portions of the front frame member. The head engaging components of the spectacle structure are of a combined length such that one of the temple members is in crossing and overlying relation with the other of the temple members when in an open and relaxed position.

11 Claims, 17 Drawing Figures

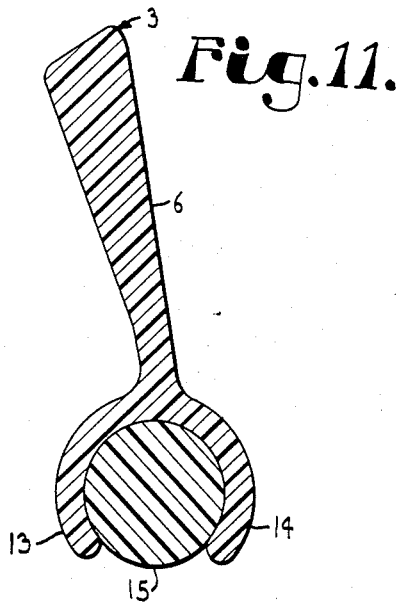
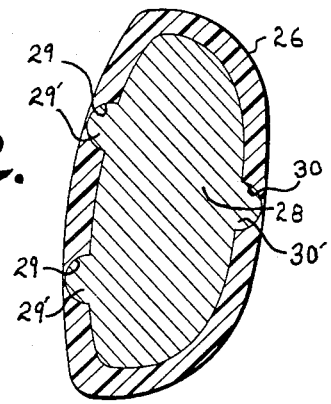
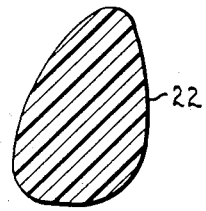
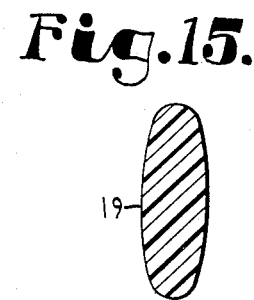
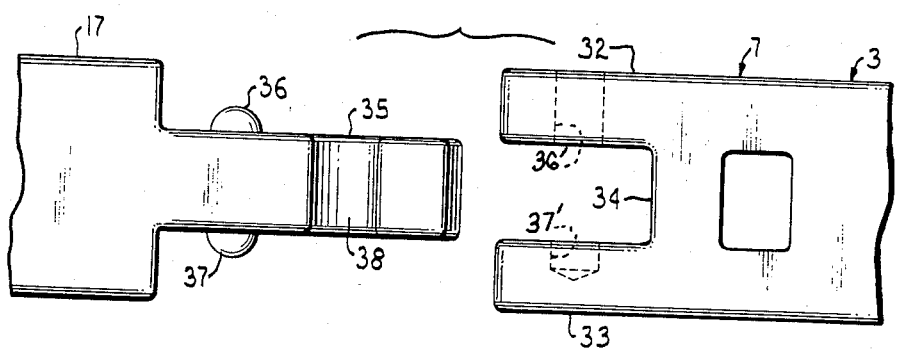
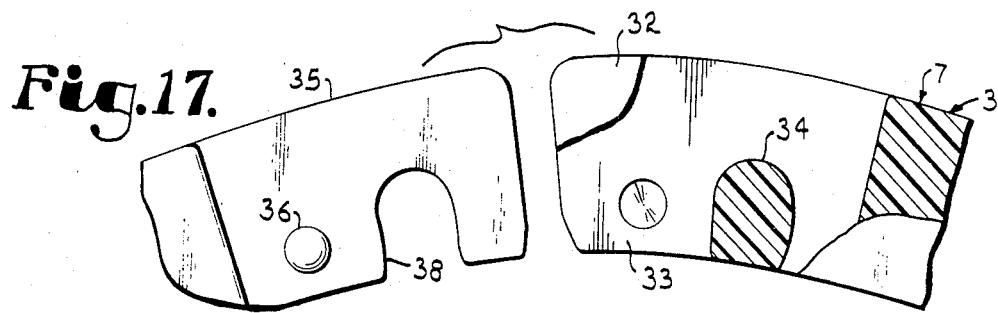

SPECTACLE STRUCTURE

The present invention relates to spectacle structures and more particularly to spectacle structures engaging the brow and side and rearward portions of the head of a person wearing the spectacle structure.

Heretofore, spectacle structures have rested and been supported on the nose and the temple members of the spectacle structures have rested on the ears and engaged the side of the head behind the ears. Such spectacle structures have the major portion of the weight thereof concentrated forward of the face of the person wearing same and, therefore, tend to bear on and slide down the nose. Springs have been added to the hinges between the lens support members and the temples or the temples arranged with resiliency to urge the temples into engagement with the head of a person wearing same and particularly the rear ends of the temples into engagement with the sides of the head behind the ears thereby rendering the respective spectacle structure uncomfortable to wear due to the pressure on sensitive parts of the head, particularly the nose, tops of the ears, and behind the ears. Also, some people have such face and nose shapes that are difficult and in some instances substantially impossible to fit with conventional eye frames that will remain in position thereon. Some structures, such as industrial glasses, have been supported on the head to avoid fatiguing support on the nose and engagement with sensitive parts of the head. Such structures are large or have tight headbands or members extending over the top of the head are unsightly and none are suitable or desirable for regular wear as spectacles.

The principal objects of the present invention are: to provide a spectacle structure that overcomes the aforementioned difficulties and that can be worn without discomfort; to provide a spectacle structure having portions engaging the head in a manner to conform to the shape thereof and shaped to avoid sensitive parts of the head; to provide such a spectacle structure wherein the frame has a front member with temple members extending therefrom and with the front frame member and the temple members being resilient to thereby provide inwardly directed forces thereby holding the spectacle structure on the person's head; to provide such a spectacle structure wherein the opposing forces are of a small magnitude and distributed around the head whereby the spectacle structure is comfortable to wear; to provide such a structure with the front member and temple members with different thicknesses in portions for unidirectional flexibility in portions for suitable engaging force to hold the spectacles in place; to provide such a spectacle structure having weighted portions of the temple members to counteract the weight of the front frame member and the temple members thereby maintaining the spectacle structure in proper position on the person's head; to provide such a spectacle structure operative to maintain same in proper position on the head without engaging the ears, nose, and other sensitive parts of the head thereby eliminating any weight engaging same or pressure on sensitive parts of the head, such as caused by portions of conventional spectacle structures; to provide such a spectacle structure adapted to conform to a large range of head sizes; and to provide such a spectacle structure which is economical to manufacture, durable in construction, easily placed on the head of a person wearing same, sufficiently tight fitting to permit freedom of movement of the head without dislodging the spectacle structure, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include exemplary embodiments illustrating various objects and features of the spectacle structure of the present invention.

FIG. 11 is an enlarged transverse sectional view taken on line 11—11, FIG. 2 and showing a center portion of the front frame member.

FIG. 12 is an enlarged transverse sectional view taken on line 12—12, FIG. 7 and showing a free end portion of one temple member.

FIG. 13 is an enlarged transverse sectional view taken on line 13—13, FIG. 3 and showing one flexible portion of the one temple member.

FIG. 14 is an enlarged transverse sectional view taken on line 14—14, FIG. 3 and showing a center portion of the one temple member.

FIG. 15 is an enlarged transverse sectional view taken on line 15—15, FIG. 3 and showing an other flexible portion of the one temple member.

FIG. 16 is an enlarged exploded side elevational view of hinge portions of a front frame member and a temple member.

FIG. 17 is an enlarged exploded top plan view of the hinge portions of the front frame member and temple member.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Figure 1:
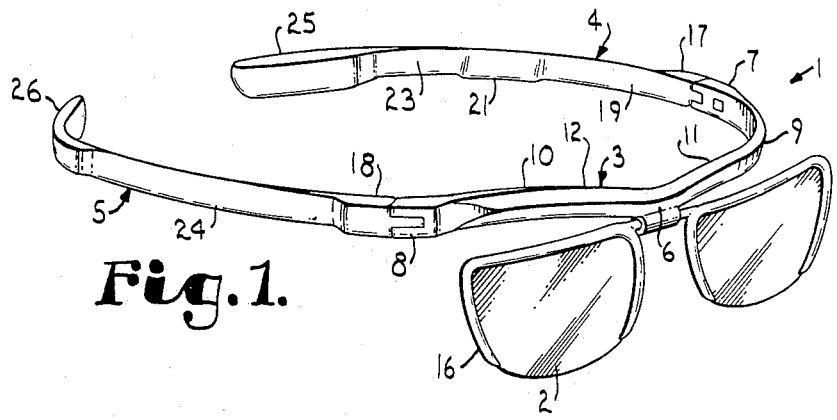
FIG. 1 is a perspective view of the spectacle structure embodying features of the present invention.
Figure 2:
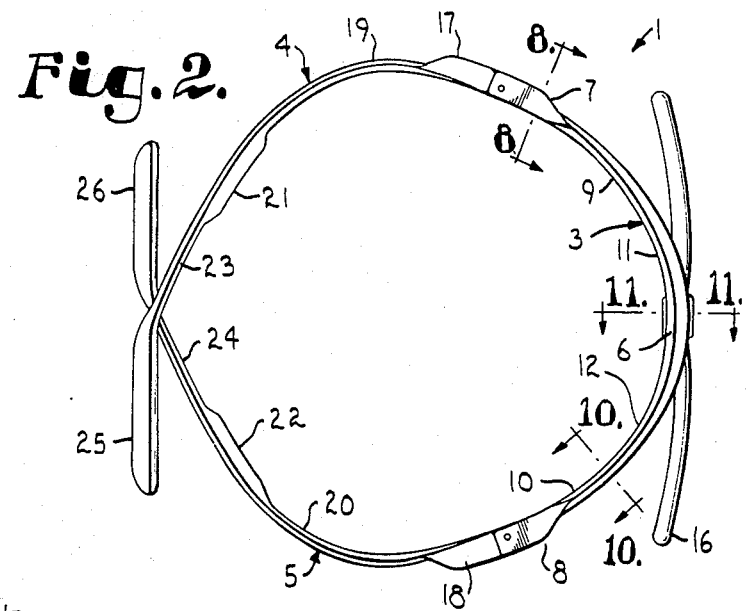
FIG. 2 is a plan view of the spectacle structure shown in a relaxed position with the temple members in crossing relation one with the other.
Figure 3:
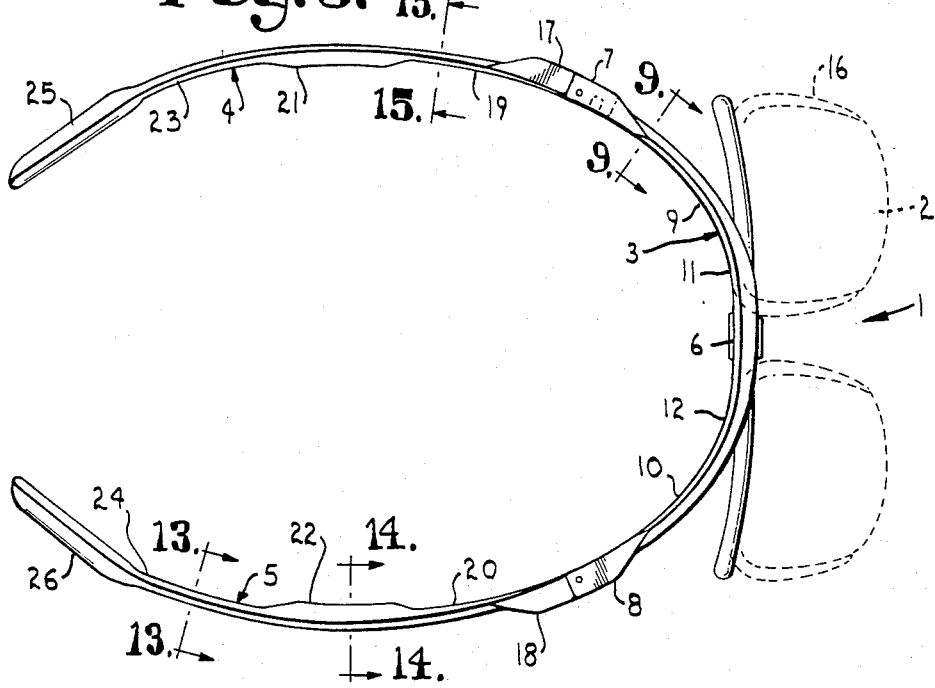
FIG. 3 is a plan view of the spectacle structure shown in an in use position.

Referring more in detail to the drawings:

In the disclosed embodiment of the present invention, the reference numeral 1 designates generally a spectacle structure having a plurality of flexible portions formed in head engaging components thereof wherein the flexible portions permit unidirectional bending of the head engaging components of the spectacle structure to thereby conform to and exert inwardly directed pressure on the head of the person wearing same to support the spectacle structure thereon. The spectacle structure 1 includes lens means 2 depending from a front frame member 3 and a pair of elongated temple members 4 and 5 which may be integral. In the illustrated structure, the temple members 4 and 5 are hingedly connected to respective opposite end portions of the front frame member 3. The head engaging components of the spectacle structure are of a combined length such that one of the temple members, for example temple member 4, is in crossing and overlying relation with the other temple member 5 when same are in an open or unfolded and relaxed position, as shown in FIG. 2.

The front frame member 3 is arcuate in plan view when in a relaxed position. The front frame member 3 has a center portion 6 and opposite end portions 7 and 8 with said frame member 3 of such a length that said end portions are substantially at the sides of a wearer's forehead. In the illustrated structure, the end portions 7 and 8 are enlarged to form respective portions of hinges, as later described.

Figure 9:
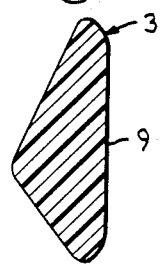
FIG. 9 is an enlarged transverse sectional view taken on line 9—9, FIG. 3 and showing one flexible portion of the front frame member.

The front frame member 3 has portions thereof engaging a forehead adjacent to and above the eyebrows of a person wearing the spectacle structure 1. The front frame member has portions of reduced thickness positioned adjacent the end portions 7 and 8 to define flexible portions 9 and 10 to permit unidirectional bending of the front frame member 3 toward or away from the wearer's head to thereby conform to respective portions of a person's forehead. The shape of the flexible portions 9 and 10 is best seen in FIG. 9.

Figure 10:
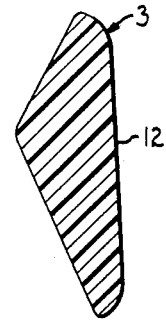
FIG. 10 is an enlarged transverse sectional view taken on line 10—10, FIG. 2 and showing one transition portion of the front frame member.

Transition portions 11 and 12 extend between the thin sections 9 and 10 and the center portion 6 and provide a transition between the thin sections or portions 9 and 10 and the center portion 6. The shape of the transition portions 11 and 12 is best seen in FIG. 10.

The center portion 6 of the front frame member 3 has a depending portion defining a lens support member having spaced arcuate arms 13 and 14 with free ends thereof spaced apart to define a generally round receptacle adapted to receive and frictionally engage a generally round center member 15 of a lens frame 16 which supports the lens means 2. The lens frame may be fixed to the front frame member 3, however, in the illustrated structure, it is removable as the structure may accomodate different lens frame with different lenses, both as the shape and type. The shape of the center portion 6 and the lens support member of the illustrated structure is best seen in FIG. 11.

Figure 4:
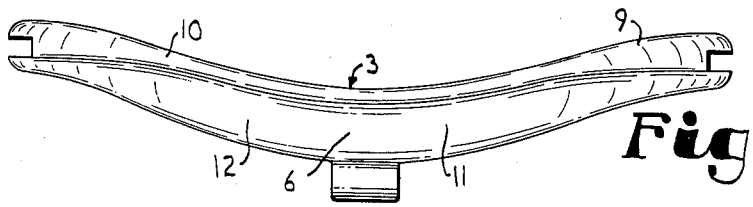
FIG. 4 is a front elevational view of a front frame member.
Figure 5:
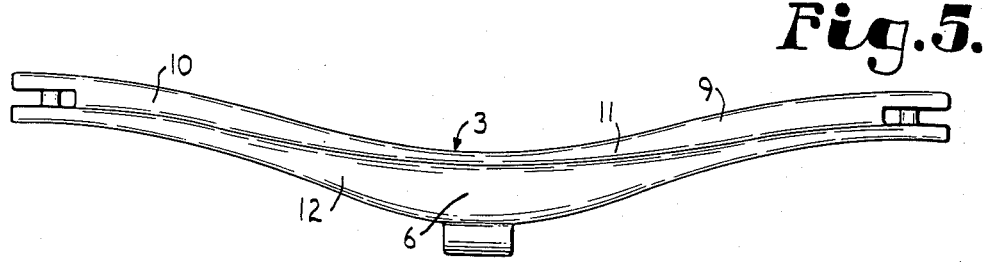
FIG. 5 is a front elevational view of the front frame member shown in a straightened position.
Figure 6:
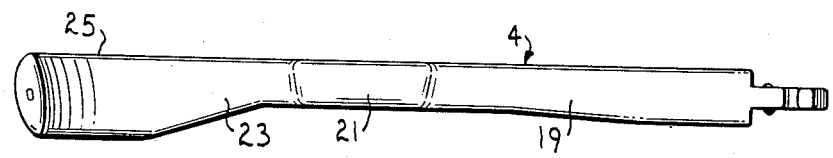
FIG. 6 is a side elevational view of one temple member.

The opposite end portions 7 and 8 of the front frame member 3 are above the center portion 6 thereby positioning the lens means 2 in front of and aligned with the eyes of a person wearing the spectacle structure 1. Positioning the end portions 7 and 8 above the center portion 6 also positions the temple members 4 and 5 above the ears of a person wearing the spectacle structure 1. The relative position of the respective portions of the front member 3 are best seen in FIGS. 4 and 5.

The temple members 4 and 5 are each elongate and arcuate in plan view when in a relaxed position. The temple members 4 and 5 and the front frame member 3 each have a cross sectional shape for substantially the lengths thereof that are bar like with the vertical dimension when on a wearer substantially greater than the transverse or horizontal dimension. This relationship provides stiff members in the vertical plane and bendable members in the horizontal plane. The temple members 4 and 5 illustrated have one end portion 17 and 18 thereof enlarged to form respective portions of the hinges, as later described. The temple members 4 and 5 have first reduced thickness portions 19 and 20 and positioned adjacent to the one end portion 17 and 18 respectively to define first flexible portions to permit unidirectional bending of the temple members 4 and 5 toward and away from the wearer's head. The shape of the first reduced thickness portions 19 and 20 is best seen in FIG. 15.

The temple members 4 and 5 have center portions 21 and 22 of increased thickness to provide increased resistance to unidirectional bending. The shape of each of the center portions 21 and 22 is best seen in FIG. 14.

The temple members 4 and 5 have second reduced thickness 23 and 24 positioned adjacent to other end portions 25 and 26 of the temple members 4 and 5 respectively. The second reduced thickness portions 23 and 24 provide flexible portions to permit unidirectional bending adjacent to the other end portions 25 and 26. The shape of the second reduced thickness portions 23 and 24 is best seen in FIG. 13. Each of the reduced thickness portions are normal to the direction of bending and the bending is toward or away from the person's head.

From a comparison of FIG. 9, FIG. 15, and FIG. 13 it is obvious that the flexible portions 9 and 10 of the front frame member 3 are thicker than respective reduced thickness portions of the temple members 4 and 5. It is also obvious from an examination of FIG. 13 that the second flexible portions 23 and 24 are the thinnest and, therefore, permit the greatest unidirectional bending to thereby permit the spectacle structure 1 to conform to the shape of the rear portions of the head of a person wearing same.

The other end portions 25 and 26 of the temple members 4 and 5 are enlarged as best seen in FIG. 12. The enlarged other end portions 25 and 26 have weights 27 and 28 respectively therein for facilitating engagement of the front frame member 3 and the temple members 4 and 5 with a person's head thereby maintaining the front frame member 3 in engagement with the forehead and the temple members 4 and 5 in engagement with the sides and back portions of the person's head. The weights 27 and 28 substantially resist any tendency of the front frame member 3 from moving downwardly on the forehead of the person.

Figure 7:
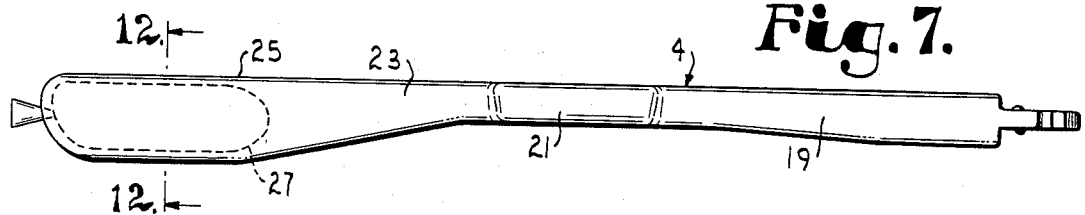
FIG. 7 is a side elevational view of the one temple member shown in a straightened position.
Figure 8:
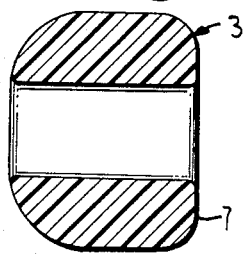
FIG. 8 is an enlarged transverse sectional view taken on line 8—8, FIG. 2 showing one end portion of a front frame member.

The enlarged other end portions 25 and 26 and the weights 27 and 28 therein have recesses 29 and 30 respectively in which prominences 29' and 30' extend to hold the weights in position. The overall shape of the end portions 25 and 26 and the weights 27 and 28 therein is best seen in FIGS. 12, 2, and 7. It is noted from FIG. 2 that the temple members 4 and 5 are in crossing and overlying relation with in an open or unfolded and relaxed position.

While the reduced thickness portions may each be varied in length and thickness they preferably are arranged to have different flexibility. In the illustrated structure, the reduced thickness or flexible portions 9 and 10 of the front frame member 3 preferably have a length approximately equal to the spacing from the center of the lens support of the adjacent end of the respective reduced thickness portion. The reduced thickness portions 19 and 20 of the temple members 4 and are of similar length to that of the reduced thickness portions 23 and 24 of the temple members are approximately twice as long as the reduced thickness portions 19 and 20. Also, the thickness in the flexible portions 9 and 10 is greater than the thickness of the portions 19 and 20 and the portions 23 and 24 are the thinnest, being about one-half to two-thirds the thickness of the portions 19 and 20. With this arrangement the bending force for said reduced thickness portions is progressively less as the spacing of said portions from the lens support is greater. Outward spreading force on temple members 4 and 5 to fit a larger head will cause some outward bending of the flexible portions 9 and 10 providing a greater spacing of the hinge portions. The spreading provides a greater outward bending of the reduced thickness portions 19 and 20 for greater spacing between the center portions 21 and 22 of the temple members. The spreading will provide the greatest outward bending of the reduced thickness portions 23 and 24 so the end portions 25 and 26 will be positioned for proper engagement of the wearer's head by the front frame member, center portions 21 and 22 and end portions 25 and 26 of the temple members. It is preferred that the spectacle structure have the reduced thickness of greater flexibility portions arranged and shaped whereby the spreading force on the end portions 25 and 26 to move same apart to engage a normal head is in the nature of three to five ounces.

FIGS. 16 and 17 illustrate the components of the opposite end portions 7 and 8 of the front frame member 3 and the components of the one end portion 17 and 18 of the temple members 4 and 5 which cooperate to form the hinged connection therebetween. In the illustrated structure, each of the opposite end portions 7 and 8 has a pair of vertically spaced upper and lower ears 32 and 33 respectively extending therefrom. The ears 32 and 33 have facing surfaces which have means therein to define aligned recesses to receive pin portions, as later described. A retainer member 34 extends between intermediate portions of the ears 32 and 33 and is preferably integral with the ears 32 and 33. The retainer member 34 is positioned intermediate the ends of the ears 32 and 33 to permit movement therebetween of a hinge member 35 extending from a respective temple member. The retainer member 34 has one edge thereof co-planar with one edge of the ears 32 and 33.

The one end portion 17 and 18 of the temple members 4 and 5 each have a hinge member 35 extending therefrom. The hinge members 35 are adapted to be received between the upper and lower ears 32 and 33 of the respective opposite end portions 7 and 8 of the front frame member 3. The pin portions 36 and 37 extend transversely from the respective hinge member 35 and are each received in the recesses of apertures 36' and 37' in a respective one of the facing surfaces of the ears 32 and 33 of the respective end portions 7 and 8 of the front frame member 3. The hinge members 35 each have surfaces defining a notch 38 in one edge thereof. The notch defining surfaces are in sliding engagement with the respective retainer member 34 of the opposite end portions 7 and 8 of the front frame member 3, thus when in closed position there is no stress on the pins 36 and 37.

Wearing the spectacle structure 1 is accomplished by moving the front frame member 3 and the temple members 4 and 5 downwardly over the head of the person until the lens frame 16 and the lens means 2 therein are in the desired position. The flexible portions 9 and 10 of the front frame member 3 and the first flexible portions 19 and 20 and the second flexible portions 23 and 24 of the temple members 4 and 5 permit the spectacle structure 1 to conform to the shape of the person's head and exert inwardly directed forces or pressure on the forehead, sides, and rear portions of the head of the person to thereby maintain same in the desired position during normal movements of the head. The temple members 4 and 5 are adapted to engage the sides of the head of the person wearing the spectacle structure 1 with the engagement being spaced from forward portions of the occipital bone of the wearer which is just behind the ear and is a particularly sensitive part of a person's head.

The spectacle structure has such flexibility that the end portions 25 and 26 may be spread to a width greater than the width of a wearer's head. The spectacle structure may then be moved rearwardly until the front frame member 3 engages the forehead adjacent the brows. The temple members are then positioned and released to engage the head. The flexibility of the structure is such that it appears to have substantially the same pressure against the head by the front frame member 3 and the temple members 4 and 5 to thereby hold the spectacles in place without any high or uncomfortable pressure points. Due to the flexibility provided by the reduced thicknesses, one size structure will fit most adults and a second smaller size will fit most children.

The front frame member 3 and the temple members 4 and 5 are preferably formed of a suitable plastic whereby they may be produced by injection molding. However, the structure may be made of metal using the variable flexibility described. A plastic or synthetic resin for the structure should be durable, strong, and have desired flexibility in their sections, for example, polyethylene, polypropylene, nylon, and the like.

It is to be understood that while I have illustrated and described one form of my invention, it is not to be limited to the specific form or arrangement of parts herein described and shown.

What I claim and desire to secure by Letters Patent is:

1. A spectacle structure comprising:
   a. a front frame member having portions engaging a forehead of a person wearing the spectacle structure at a level adjacent to the eyebrows, said front frame member having opposite end portions and a length positioning same at respective sides of a person's forehead, said front frame member having a center portion and portions of reduced thickness adjacent each of said end portions thereof to define respective flexible portions to permit unidirectional bending toward and away from the person's head;
   b. lens means connected to and supported by said front frame member; and
   c. a pair of elongated temple members each having one end portion thereof connected to a respective one of the opposite end portions of said front frame member, said temple members being adapted to extend rearwardly from said front frame member and terminate in rear free end portions, said temple members each having a center portion and first and second portions of reduced thickness adjacent the center portion thereof to define respective flexible portions to permit unidirectional bending toward and away from the person's head, whereby said front frame member and said temple members conform to and exert inwardly directed pressure on a person's head to support the spectacle structure thereon.

2. A spectacle structure as set forth in claim 1 wherein:
   a. said first portions of reduced thickness of said temple members each are positioned between the respective center portion thereof and a respective opposite end portion of said front frame member;
   b. said reduced thickness portions of said front frame member and said first portions of reduced thickness of said temple members each have a respective shape such that the resistance to the unidirectional bending of said temple member first portions is less than the resistance to the unidirectional bending of said reduced thickness portions of said front frame member;
   c. said second portions of reduced thickness of said temple members each are positioned between the respective center portion and the free end thereof; and
   d. said first portions of reduced thickness and said second portions of reduced thickness of each of said temple members each have a respective shape such that the resistance to the unidirectional bending of said temple member second portions is less than the resistance to the unidirectional bending of said temple member first portions.

3. A spectacle structure as set forth in claim 1 wherein said front frame member and said temple members are of a combined length such that one of said temple members is in crossing and overlying relation with the other of said temple members when in an open and relaxed position.

4. A spectacle structure as set forth in claim 1 wherein:
   a. the one end portion of each of said temple members is hingedly connected to a respective one of the opposite end portions of said front frame member;
   b. each of the opposite end portions of said front frame member has a pair of spaced ears extending therefrom and a retainer member extending between intermediate portions of said ears;
   c. facing surfaces of said ears each have aligned recesses therein;
   d. the one end portion of each of said temple members has a hinge member extending therefrom and received between the ears extending from a respective one of the opposite end portions of said front frame member;
   e. the one end portion of each of said temple members has pin portions extending transversely therefrom and each received in the recess in a respective one of the facing surfaces of said ears of a respective one of the opposite end portions of said front frame member;
   f. the one end portion of each of said temple members has surfaces defining a notch in one edge thereof; and
   g. said surfaces defining the notch are in sliding engagement with the hinge member of a respective one of the opposite end portions of said front frame member.

5. A spectacle structure as set forth in claim 1 wherein:
   a. the other end portion of each of said temple members is an enlarged portion; and
   b. said enlarged portions of each of said temple members each have a weight therein for facilitating engagement of said front frame member and said temple members with the person's head thereby maintaining said front frame member in engagement with the forehead and said temple members in engagement with the sides and back portions of the person's head.

6. A spectacle structure as set forth in claim 5 wherein said front frame member and said temple members are of a combined length such that one of said temple members is in crossing and overlying relation with the other of said temple members when in an open and relaxed position.

7. A spectacle structure as set forth in claim 6 wherein:
   a. the one end portion of each of said temple members is hingedly connected to a respective one of the opposite end portions of said front frame member;
   b. the hinged connection of the one end portion of each of said temple members to a respective one of the opposite end portions of said front frame member comprises:
      1. a pair of laterally spaced ears extending from each of the opposite end portions of said front frame member, said ears having facing surfaces;
      2. means in the facing surfaces of said ears defining aligned recesses therein;
      3. a retainer member extending between intermediate portions of each of said pair of ears;
      4. a hinge member extending from the one end portion of each of said temple members, said hinge members each being received between the ears extending from a respective one of the opposite end portions of said frame front member;
      5. pin portions extending transversely from the hinge member of each of said temple members and each received in the recess in a respective one of the facing surfaces of said ears of a respective one of the opposite end portions of said front frame member; and
      6. surfaces in each of said hinge members defining a notch in one edge thereof, said notch defining surfaces being in sliding engagement with the retainer member of a respective one of said opposite end portions of said front frame member.

8. A spectacle structure comprising:
   a. a front frame member engaging a forehead of a person wearing the spectacle structure at a level adjacent to the eyebrows and having a center portion and opposite end portions and a length positioning said end portions at respective sides of a person's head, said front frame member having portions of reduced thickness adjacent each of said end portions thereof to define respective flexible portions to permit unidirectional bending toward and away from the person's head, said opposite end portions of said front frame member being positioned above said center portion thereof;

b. a lens support member depending from the center portion of said frame member;

c. a lens frame mounted on said lens support member and having lens means therein and positioned forward of and aligned with the person's eyes;

d. a pair of elongated temple members each having one end portion thereof hingedly connected to a respective one of the opposite end portions of said front frame member and extending rearwardly therefrom and terminate in rear free end portions, said temple members each having a first portion of reduced thickness adjacent the one end portion thereof to define respective first flexible portions to permit unidirectional bending toward and away from the person's head and a second portion of reduced thickness adjacent the rear free end portion thereof to define respective second flexible portions thereof to permit unidirectional bending toward and away from the person's head whereby said front frame member and said temple members conform to and exert inwardly directed pressure on a person's head to support the spectacle structure thereon; and e. a weight in the rear free end portion of each of said temple members for maintaining engagement of said front frame member with a forehead adjacent to the eyebrows of a person wearing the spectacle structure and engagement of said temple members with respective portions of the sides and back of the person's head.

9. A spectacle structure as set forth in claim 8 wherein said front frame member and said temple members are of a combined length such that one of said temple members is in crossing and overlying relation with the other of said members when in an open and relaxed position.

10. A spectacle structure as set forth in claim 9 wherein the hinged connection of the one end portion of each of said temple members to a respective one of the opposite end portions of said front frame member comprises:

a. upper and lower vertically spaced ears extending from each of the opposite end portions of said front frame member, said ears having facing surfaces;

b. means in the facing surfaces of said ears defining aligned recesses therein;

c. a retainer member extending between intermediate portions of each of said pair of ears;

d. a generally planar hinge member extending from the one end portion of each of said temple members, said hinge members each being received between the ears extending from a respective one of the opposite end portions of said frame front member;

e. pin portions extending transversely from the hinge member of each of said temple members and each received in the recess in a respective one of the facing surfaces of said ears of a respective one of the opposite end portions of said front frame member; and f. surfaces in each of said hinge members defining a notch ine one edge thereof, said notch defining surfaces being in sliding engagement with the retainer member of a respective one of said opposite end portions of said front frame member.

11. A spectacle structure as set forth in claim 9 wherein:

a. said front frame member and each of said temple members are each of greater vertical dimension than horizontal dimension for stiffness in a vertical direction and limited flexibility in a horizontal direction for movement toward and away from a person's head;

b. said first portions of reduced thickness of said temple members and said reduced thickness portions of said front frame member each have a respective shape such that the resistance to the unidirectional bending of said temple member first portions is less than the resistance to the unidirectional bending of said reduced thickness portions of said front frame member; and c. said first portions of reduced thickness and said second portions of reduced thickness of each of said temple members each have a respective shape such that the resistance to the unidirectional bending of said temple member second portions is less than the resistance to the unidirectional bending of said temple member first portions.

* * * * *